US010012834B2

(12) United States Patent
Powell (10) Patent No.: US 10,012,834 B2
(45) Date of Patent: Jul. 3, 2018

(54) EXIT PUPIL-FORMING DISPLAY WITH RECONVERGENT SHEET

(71) Applicant: Microsoft Technology Licensing, LLC, Redmond, WA (US)

(72) Inventor: Karlton D. Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/246,425

(22) Filed: Aug. 24, 2016

(65) Prior Publication Data

US 2017/0261748 A1 Sep. 14, 2017

Related U.S. Application Data

(60) Provisional application No. 62/305,512, filed on Mar. 8, 2016.

(51) Int. Cl.
*G02B 27/01* (2006.01)
*G02B 3/00* (2006.01)
(Continued)

(52) U.S. Cl.
CPC ....... *G02B 27/0101* (2013.01); *G02B 3/0062* (2013.01); *G02B 3/0087* (2013.01);
(Continued)

(58) Field of Classification Search
CPC ........ G02B 6/04; G02B 6/08; G02B 27/0081; G02B 27/0172; G02B 27/00;
(Continued)

(56) References Cited

U.S. PATENT DOCUMENTS 2,351,034 A 6/1944 Gabor
5,291,334 A 3/1994 Wirth et al.
(Continued)

FOREIGN PATENT DOCUMENTS

KR 20090009588 1/2009
KR 20140012396 2/2014
(Continued)

OTHER PUBLICATIONS

Mungan, C.E., The Cat's Eye Retroreflector, Retrieved on: Dec. 7, 2015 Available at: http://www.usna.edu/Users/physics/mungan/_files/documents/Scholarship/Retroreflector.pdf.
(Continued)

*Primary Examiner* — William R Alexander
(74) *Attorney, Agent, or Firm* — Lempia Summerfield Katz LLC (57) ABSTRACT

A display includes a source that establishes an exit pupil of far field content, a reconvergent sheet disposed along an optical axis to receive light of the far field content, the reconvergent sheet being configured to reconverge the far field content in position space, a reflective surface disposed along the optical axis for reflection of light of the position space back through the reconvergent sheet after reflection off of the reflective surface to re-form the exit pupil of the far field content, and a splitter disposed along the optical axis between the source and the reconvergent sheet and configured to redirect light exhibiting the re-formed exit pupil in a direction offset from the optical axis.

20 Claims, 7 Drawing Sheets

US 10,012,834 B2
Page 2

(51) Int. Cl.
| | |
|---|---|
| *G02B 17/08* | (2006.01) |
| *G02B 27/28* | (2006.01) |
| *G02B 27/10* | (2006.01) |
| *G02B 13/26* | (2006.01) |
| *G02B 17/00* | (2006.01) |
| *G02B 27/22* | (2018.01) |

(52) U.S. Cl.
CPC ........... *G02B 13/26* (2013.01); *G02B 17/002* (2013.01); *G02B 17/08* (2013.01); *G02B 17/0856* (2013.01); *G02B 27/01* (2013.01); *G02B 27/1066* (2013.01); *G02B 27/2292* (2013.01); *G02B 27/283* (2013.01); *G02B 2027/0145* (2013.01)

(58) Field of Classification Search
CPC .............. G02B 27/0075; G02B 27/017; G02B 2027/0123; G02B 2027/0145; G02B 27/0101; G02B 3/0062; G02B 17/08; G02B 27/283; G02B 27/01
USPC .......................................................... 359/622
See application file for complete search history.

(56) References Cited

U.S. PATENT DOCUMENTS

| | | | |
|---|---|---|---|
| 5,463,498 A * | 10/1995 | Gal | G02B 3/0056 359/619 |
| 5,579,161 A | 11/1996 | Sekiguchi | |
| 5,621,572 A | 4/1997 | Fergason | |
| 5,731,899 A | 3/1998 | Meyers | |
| 5,822,125 A * | 10/1998 | Meyers | G02B 3/0056 348/E5.028 |
| 5,973,844 A | 10/1999 | Burger | |
| 6,317,037 B1 | 11/2001 | Ayres et al. | |
| 6,381,072 B1 | 4/2002 | Burger | |
| 6,796,656 B1 | 9/2004 | Dadourian | |
| 6,842,297 B2 | 1/2005 | Dowski, Jr. | |
| 6,937,221 B2 | 8/2005 | Lippert et al. | |
| 7,042,645 B2 | 5/2006 | Houlihan et al. | |
| 7,116,405 B2 | 10/2006 | Johnson | |
| 7,186,004 B2 | 3/2007 | Powell et al. | |
| 7,274,808 B2 | 9/2007 | Baharav et al. | |
| 7,589,900 B1 | 9/2009 | Powell | |
| 7,764,429 B2 * | 7/2010 | Nomura | B41J 2/451 347/238 |
| 7,839,573 B2 | 11/2010 | Wippermann et al. | |
| 7,956,924 B2 | 6/2011 | Georgiev | |
| 7,986,315 B2 | 7/2011 | Sprague et al. | |
| 8,085,218 B2 | 12/2011 | Heisch | |
| 8,120,858 B2 | 2/2012 | Choi et al. | |
| 8,299,980 B2 | 10/2012 | Takahashi et al. | |
| 8,622,549 B2 | 1/2014 | Linden et al. | |
| 8,670,171 B2 | 3/2014 | Martin et al. | |
| 8,711,466 B2 | 4/2014 | Kroll et al. | |
| 8,715,079 B1 | 5/2014 | Loose | |
| 8,867,136 B2 | 10/2014 | Hashikawa | |
| 9,030,503 B2 | 5/2015 | Moore | |
| 9,049,381 B2 | 6/2015 | Venkataraman et al. | |
| 9,426,455 B2 * | 8/2016 | Horstmeyer | G01N 23/205 |
| 2002/0034014 A1 | 3/2002 | Gretton et al. | |
| 2005/0248849 A1 | 11/2005 | Urey et al. | |
| 2006/0232747 A1 | 10/2006 | Thornton et al. | |
| 2007/0103747 A1 | 5/2007 | Powell et al. | |
| 2007/0159700 A1 | 7/2007 | Danner et al. | |
| 2008/0001850 A1 | 1/2008 | Champion et al. | |
| 2009/0190098 A1 | 7/2009 | DeJong et al. | |
| 2009/0231698 A1 | 9/2009 | Hashimoto et al. | |
| 2009/0262182 A1 | 10/2009 | Javidi et al. | |
| 2010/0079861 A1 | 4/2010 | Powell | |
| 2010/0245345 A1 | 9/2010 | Tomisawa et al. | |
| 2010/0271290 A1 | 10/2010 | Tomisawa et al. | |
| 2010/0315597 A1 | 12/2010 | Powell et al. | |
| 2012/0105310 A1 | 5/2012 | Sverdrup et al. | |
| 2012/0300273 A1 | 11/2012 | Lin | |
| 2013/0003022 A1 | 1/2013 | Tanaka et al. | |
| 2013/0285885 A1 | 10/2013 | Nowatzyk et al. | |
| 2013/0341493 A1 | 12/2013 | Ando et al. | |
| 2014/0376097 A1 | 12/2014 | Yamashita et al. | |
| 2015/0049383 A1 | 2/2015 | Janins et al. | |
| 2017/0003448 A1 * | 1/2017 | Marshall | G02B 27/0081 |
| 2017/0105618 A1 * | 4/2017 | Schmoll | A61B 3/102 |

FOREIGN PATENT DOCUMENTS

| | | |
|---|---|---|
| WO | 2014048999 A1 | 4/2014 |
| WO | 2014133481 | 9/2014 |

OTHER PUBLICATIONS

Yamamoto, et al., "Floating Aerial LED Signage Based on Aerial Imaging by Retro-Reflection (AIRR)", In Journal of Optics Express, vol. 22, Issue 22, Oct. 23, 2014, pp. 26919-26924.

Tsvetkov. A. D. "Catadioptric Retroreflector", In Journal of Optical Technology, vol. 78, Issue 3, Mar. 2011, 3 pages.

Urey, et al. "Microlens array-based exit pupil expander for full color display applications", Proc. SPIE vol. 5456, Apr. 2004, 11 pages.

"Anti-reflective glass (AR-Glass)", Retrieved on: Aug. 25, 2015 Available at: http://biz.everychina.com/shanghai_manbo-r/z6504064-ag_glass_anti_glare_glass.html.

"Compact Microoptical Imaging System for Digital Close-Up Imaging", Retrieved on: Jun. 15, 2015, Available at:http://www.iof.fraunhofer.de/content/dam/iof/en/documents/pb/Compact%/20Microoptical%20Imaging%20System%20for%20Digital%20Close-Up%20Imaging.pdf.

"International Search Report & Written Opinion Issued in PCT Application No. PCT/US2017/020058", dated Jun. 1, 2017, 13 Pages.

"International Search Report & Written Opinion Issued in PCT Application No. PCT/US2017/020059", dated Jun. 1, 2017, 17 Pages.

"SELFOC® Lens Array", Retrieved on: Jun. 15, 2015, Available at: http://welcome.gofoton.com/product/lens_array/.

Aldalali, et al., "A micro camera utilizing a microlens array for multiple viewpoint imaging", In Proceedings of 16th International Solid-State Sensors, Actuators and Microsystems Conference, Jun. 5, 2011, 4 pages.

Brady, et al., "Multiscale lens design", In Proceedings of Optics Express, vol. 17, No. 13, Jun. 10, 2009, pp. 10659-10674.

Bruckner, et al., "Ultra Compact Close up Microoptical Imaging System", In Proceedings of Current Developments in Lens Design and Optical Engineering XI; and Advances in Thin Film Coatings VI, Aug. 19, 2010, 3 pages.

Hembd-Sölner, et al., "Imaging properties of the Gabor superlens", In Journal of Optics A: Pure and Applied Optics vol. 1 No. 1, Jan. 1991, 2 pages.

Lanman, et al., "Near-Eye Light Field Displays", ournal of ACM Transactions on Graphics, Nov. 2013, 10 pages, vol. 36, Issue 6.

Meyer, et al., "Optical Cluster Eye Fabricated on Wafer-Level", Optics Express, Aug. 22, 2011, pp. 17506-17519, vol. 19, Issue 18.

Park, et al., "Compact Near-Eye Display System Using a Superlens-based Microlens Array Magnifier", IEEE 28th International Conference on Micro Electro Mechanical Systems, Jan. 18, 2015, pp. 952-955.

Rajasekharan, et al., "Analysis of an array of micro lenses using Fourier-transform method", In Proceedings of IET Optoelectronics, vol. 4, Issue 5, Oct. 2010, pp. 210-215.

Shaoulov, et al., "Compact Microlenslet-Array-Based Magnifier", Optics Letters, Apr. 1, 2004, pp. 709-711, vol. 29, Issue 7.

Spring et al., "Confocal Microscope Scanning Systems", Available at: http://www.olympusconfocal.com/theory/confocalscanningsystems.html.

Stollberg, et al., "The Gabor superlens as an alternative waferlevel camera approach inspired by superposition compound eyes of nocturnal insects", In Proceedings of Optics Express, vol. 17, Issue 18, Aug. 31, 2009, pp. 15747-15759.

(56) References Cited

OTHER PUBLICATIONS

U.S. Appl. No. 14/538,783, Powell, et al., "High Accuracy Corner Cube Arrays for High Resolution Retroreflective Imaging Applications", filed Nov. 11, 2014.

U.S. Appl. No. 14/588,792, Powell, et al., "Retro-Imaging System Having High Efficiency Through Control of Polarization with Minimized Polarization-Filtering Induced Diffractive Artifacts Impacting Resolve", filed Jan. 2, 2015.

Wu et al., "100% Fill-Factor Aspheric Microlens Arrays (AMLA) With Sub-20-nm Precision", IEEE Photonics Technology Letters, Aug. 18, 2009, pp. 1535-1537, vol. 21, Issue 20.

Yamamoto et al., "Aerial 3D LED Display by Use of Retroreflective Sheeting", SPIE—IS&T Electronic Imaging, 2013, 8 pages, vol. 8648.

Yamamoto, et al., "Aerial LED signage by use of crossed-mirror array", In Proceedings of SPIE, Advances in Display Technologies III, vol. 8643, Mar. 1, 2013.

Yamamoto, et al., "Design of crossed-mirror array to form floating 3D lens signs", In Proceedings of SPIE, Stereoscopic Displays and Applications XXIII, vol. 8288, Feb. 6, 2012.

Yeom, et al., "Viewing window expansion in integral floating display using tilted side mirrors", In Proceedings of 3DTV Conference: The True Vision—Capture, Transmission and Display of 3D Video, May 16, 2011, 4 pages.

\* cited by examiner

EXIT PUPIL-FORMING DISPLAY WITH RECONVERGENT SHEET

CROSS-REFERENCE TO RELATED APPLICATION

This application claims the benefit of U.S. provisional application entitled "Array-Based Floating Display," filed Mar. 8, 2016, and assigned Ser. No. 62/305,512, the entire disclosure of which is hereby expressly incorporated by reference.

DESCRIPTION OF THE DRAWING FIGURES

For a more complete understanding of the disclosure, reference is made to the following detailed description and accompanying drawing figures, in which like reference numerals may be used to identify like elements in the figures. Elements may not be shown to scale for ease in illustration.

The disclosed displays and devices may assume various forms. Specific examples are illustrated in the drawing (and are hereafter described) with the understanding that the disclosure is intended to be illustrative, and is not intended to limit the invention to the specific examples described and illustrated herein.

DETAILED DESCRIPTION

Scanned beams are used to provide heads-up, near-eye, and other displays. The scanned beam is typically used to form a raster at an intermediate image plane. The raster is then imaged to the eye through viewer optics, sometimes referred to as distal optics, in order to form an image at an apparent distance in front of the viewer. The optical length of such displays may be longer than two-dimensional displays due to, for instance, the intermediate image plane. Scanned beam displays are nonetheless useful because the light sources (e.g., lasers) often provide high color gamut (e.g., near saturated colors) and high brightness.

Described herein are displays that include one or more reconvergent sheets to re-form an exit pupil established by scanned beams or other sources of far field content or angle space light. The angle space of the light (e.g., the scan angle) from the source may thus be mapped (e.g., directly mapped) to the field of view for the display. Scaling of the scan angle may also be provided in some cases. Either way, the reconvergent sheet removes the need for an intermediate image plane and viewer optics to convert scan angle to field of view, as described below.

The sheets are characterized as "reconvergent" in connection with the imaging properties of the sheets. A reconvergent sheet provides retroreflective, transmissive or other imaging of content in a manner that involves convergence of the image content after, and as a result of, the illumination of the reconvergent sheet by the light exhibiting the image content. For example, in retroreflective cases, a reconvergent sheet acts as an imaging retroreflector, with the term "imaging" being used to connote an optical element that avoids image breakup and detrimental diffraction effects. The imaging is provided at efficiency and quality levels commensurate with the capabilities of a viewer of the content and/or source. For instance, the reconvergent sheet may be quite efficient as described herein, limited only by Fresnel surface reflections, which may be reduced further by use of anti-reflection (AR) coatings. Because the reconvergent sheet maintains polarization, any given or random polarization may be used without decreasing efficiency. The sheet avoids image breakup and may be optimized for best focus.

The lack of image breakup and other detrimental effects (e.g., diffraction, defocusing, and contrast loss) distinguishes the reconvergent sheets described herein from non-imaging retroreflectors. For example, a retroreflector sheet using microbeads of high refractive index exhibits reasonable angular response, but suffers from the fact that the index must be very closely held, such as near n=2, in order to minimize angular spread or diffusion from diffraction and defocus effects, which thus typically results in contrast loss in a retroreflective display system. A retroreflective array sheet using multiple cells of corner cube reflectors may be used to achieve retroreflection, but such types of retroreflector sheets suffer from both (1) diffraction effects due to effective masking of some portion of the input light not being retroreflected due to dead zones in the retroreflector design, such as tri-cut type retroreflective film, and (2) image breakup caused by a physical lateral offset of the output light ray relative to input light ray, due to raytracing through each of multiple adjacent corner cube cells. Because these types of retroreflective sheets are formed using flat facets to comprise each corner cube cell, imaging performance may be improved only to the point at which the facet angles are precise enough to redirect the input rays back in the opposite direction, beyond which the sheet is limited in performance due to both diffraction artifacts from effective masking and image breakup effect.

In contrast to the non-imaging retroreflectors described above, a retroreflective sheet including, for instance, microlens arrays avoids such image breakup effect and reduces diffraction effects, because the sheet has the ability to deconstruct input light and reconstruct output light across a full cell without masking any significant portions of the input light. As such, light that is diverging into sheet is then reconverged to form an image of that input object light. If the sheet is reflective, the reconvergence may be retroreflective. If the sheet is transmissive, the input light is transmitted through sheet and reconverged. Input light diverging from a point source object reconverges to form an image of that object, while input light that is collimated and pointed in a direction is redirected in a complimentary opposed direction, whether retroreflected or transmitted, while maintaining collimation.

The reconvergent sheet may thus be disposed in transmissive and retroreflective configurations. In retroreflective configurations, the reconvergent sheet may include two microlens array layers and a reflective layer. The transmissive configuration may include two pairs of microlens array layers (four total layers). As described below, the reconvergent sheet (e.g., a transmissive reconvergent sheet) is not limited to microlens arrays, insofar as graded index (GRIN) lens arrays may be used to form a retroreflective or transmissive reconvergent sheet. In retroreflective cases, the display may be a see-through display in which a splitter acts as a combiner to redirect the light after retroreflection via the reconvergent sheet. A reflector is positioned for the retroreflection such that half of the optical path through the reconvergent sheet is illuminated twice, once to convert the angle space light to position space, and a second time to convert the position space back to angle space. In transmissive configurations, a reconvergent sheet may include, for example, two, in-tandem Fourier transform equivalent pairs (e.g., four microlens arrays or two Fourier transform equivalent length GRIN lens arrays) to re-form the exit pupil in connection with an occluded display.

The displays are capable of providing high efficiency and high quality imaging of far field content. The retroreflective or transmissive imaging provided the reconvergent sheet may have high levels of both efficiency and quality. Distortion may be low, e.g., limited to the distortion of the scanner or other source. The distortions introduced by scan engine optics, field lenses, and other viewing optics may be avoided. Without those distortions, elements often used to correct for the distortions may also be avoided. Moreover, microelectromechanical system (MEMS) and other scanners are capable of achieving fairly high scan angles, thereby allowing a fairly wide field of view to be realized. The disclosed displays may achieve such efficiency, quality, and other performance levels despite being low cost, and while being both wavelength and polarization independent.

In some cases, the reconvergent sheet includes a pair of in-tandem microlens arrays (MLAs) to provide reconvergent imaging. The pair of in-tandem MLAs are arranged as a stack or assembly such that conelets of light are stitched by cells of the reconvergent sheet into a complete numerical aperture (NA) without gapping. Erect, high efficiency imaging is achieved. The MLAs of each pair are separated by the focal length of the constituent lenslets (e.g., array elements) of the MLAs. The MLAs may thus be disposed in a compact (or short track length) stack configuration.

The focal length separation of the in-tandem MLA pair leads to high efficiency imaging. Each in-tandem pair implements a full, true Fourier transform between angle space and position space (or spatial frequency space). Implementing a full Fourier transform avoids losses and other distortions by addressing the diffraction arising in connection with each MLA. Without the second MLA for each cell of the reconvergent sheet, the transform appears to be a Fourier Transform (FT) in intensity, but not in phase, as a quadratic phase error remains. Phase correction is provided by the second MLA of each pair, which effectively provides telecentric correction of the output. The second array of the in-tandem FT MLA pair prevents loss and scatter of light having higher spatial frequency content, or light having higher angle of incidence, at an intermediate transform plane between the arrays of the pair. Without phase correction at that array, a portion of light involved in fully resolving the object (within the diffraction limit defined by lenslet acceptance numerical aperture NA) would be lost. By making use of in-tandem FT MLA pairs, apodization is accordingly avoided, thereby reducing diffractive artifacts and minimizing loss of system resolve or loss of optical performance, such as Modulation Transfer Function (MTF). The fully formed diffraction output of the in-tandem pair is then fully utilized by either a second in-tandem pair in transmissive cases, or by again by the in-tandem pair after reflection in retroreflective cases, to instead improve the efficiency of the lens system and, thus, image quality. Clipping and vignetting are also avoided via the phase correction. The MLA-based lens system is instead capable of stitching conelets of light into a complete numerical aperture (NA) without gaps.

Higher efficiencies may also be attainted due to a higher fill factor of the MLAs. Some microlens arrays are capable of being molded with 100% fill factor. For example, microlens arrays formed by replication using an etched master or diamond machining may achieve 100% fill factor, while microlens arrays formed by photoresist reflow will have flat gaps between lenslets, and microlens arrays formed by grey-scale lithography may exhibit rounded seams at the edges of each lenslet causing scatter. Other solutions, such as GRIN rod arrays, have a 10% loss in fill factor arising from hexagonal packing of round rods. Further, arrays of round lenses have similar gaps in fill factor. By making use of high fill factor types of MLAs or GRIN fiber faceplates from boules, or arrays of lenses each having a shape suitable for tiling, including hexagonal, rectangular and square shapes, high efficiency may be maintained. MLAs may utilize aperture array masking at any plane within the stack to help reduce scatter of input light higher than the acceptance of each lenslet, while extra-mural absorption (EMA) absorbing glass or fiber may be utilized periodically within a GRIN fiber array to reduce such scatter.

The arrangement of the MLA pairs provides output without a tiling effect, the so-called lensitization arising from lens system acceptance and pointing angle. The tiling effect is avoided without having to resort to extensive increases in overall system length. The lens systems may therefore be provided in a compact, or thin, form factor (e.g., a stack of sheets or thin films) appropriate for portable and other electronic devices, such as near-eye and other devices having a thin profile.

The transmissive configurations described herein enable high quality, high efficiency of far field content, without the need to rely on polarization control or double-pass setups to re-form the far field content, thereby substantially simplifying system setup relative to other displays.

The reflective floating displays include a reflective sheet stack. The reflective sheet stacks described herein utilize the fold symmetry of the transmissive reconvergent sheets. For instance, the reflective sheets may use a single in-tandem Fourier Transform corrected set of microlens arrays in conjunction with a reflector, or mirror layer. With the reflective sheet, far field content, e.g., containing pseudo-collimated beamlets at various pointing angles, diverges toward the sheet, and is reflected for reconvergence in front of the stack. The reflective sheet stacks are incorporated into a beam splitter configuration, such that reconvergence occurs after redirection by the splitter, as in a double-pass folded system.

The displays are not limited to MLA-based array assemblies. Other types of retroreflective and lensing structures and arrays may be used as long as the structures are reconvergent. For instance, each reconvergent sheet may include an array of GRIN microlensing structures. Each GRIN microlensing structure of the array then corresponds with a respective one of the cells of the reconvergent sheet. Each GRIN microlensing structure is thus configured to exhibit, or act as, a pair of Fourier transform lenses.

As used herein, the term "cell" is used to refer to a unit of a reconvergent sheet. Because, in some cases, a reconvergent sheet includes a pair of arrays, a cell may include an FT pair of array elements, one from each array. In other cases (e.g., GRIN cases), a cell corresponds with a single element of the array that provides the equivalent of an FT lensing pair.

Figure 1:
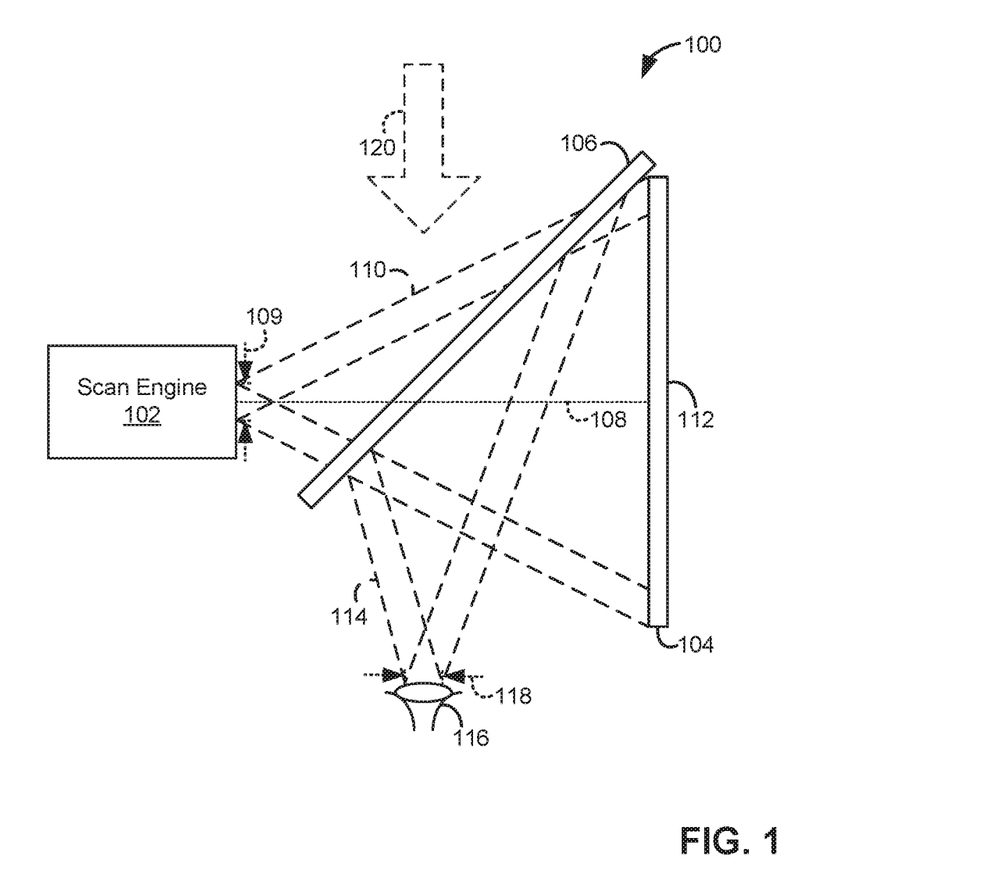
FIG. 1 is a schematic view of a see-through display with a reconvergent sheet to re-form an exit pupil in accordance with one example.

FIG. 1 shows a display 100 configured in accordance with one example. In this case, the display 100 is configured in a double-pass, retroreflective configuration. The display 100 may be configured as a heads-up display, near-eye display, or other device.

The display 100 includes a source 102, a reconvergent sheet 104, and a splitter 106 arranged along an optical axis 108. The source 102 establishes an exit pupil 109 of far field content or angle space light 110. The reconvergent sheet 104 is disposed along the optical axis 108 to receive the light 110 after the light 110 (or a portion thereof) passes through the splitter 106. The reconvergent sheet 104 is configured to reconverge the far field content in position space. The light illuminating and passing through the reconvergent sheet 104 encounters a reflective surface 112 of the display 100. The reflective surface 112 is disposed along the optical axis 108 for reflection of the position space light back through the reconvergent sheet 104. In this example, the reflective surface 112 is disposed along or integrated with a rear surface of the reconvergent sheet 104. The reflective surface 112 is configured and oriented to reflect the light back toward the splitter 106 along the optical axis 108.

The light reflecting off of the reflective surface 112 illuminates the reconvergent sheet 104 again. Passing the position space light through the reconvergent sheet 104 a second time converts the position space light back into angle space to re-form the exit pupil 109 of the far field content. In the double-pass example of FIG. 1, a portion 114 of the angle space light is redirected by the splitter 106 toward a viewer 116. The exit pupil 109 is re-formed as field of view 118 as shown. The display 100 may thus provide direct conversion of the scan angle of the source 102 into the field of view 118 observed by the viewer 116, with an image that appears to be at infinity.

The display 100 may be configured to operate as a combiner. For example, the display 100 may be a see-through display. Ambient light 120 is allowed to also reach the viewer 116 via the double pass configuration of the display 100. The ambient light 120 (or a portion thereof) passes through the splitter 106. In this example, the ambient light 120 is oriented in a direction orthogonal to the optical axis 108. Other orientations or configurations may be used. In other cases, the display 100 is configured as an occluded type display or other display that restricts or prevents the ambient light 120 from reaching the viewer 116.

The source 102 may include a scanned beam system or other scan engine or other type of projector. For example, the source 102 may be configured as a projector or other imager capable of generating collimated light (or effectively collimated light) at varying scan angles. The source 102 is configured relative to the rest of the display 100 to generate the light such that the display content is effectively presented in angle space, or the far field, e.g., with conjugate distances along the optical axis 108 effectively approaching infinity. The source 102 may include light emitting diode (LED), laser, or other light emitting elements. The projector or other scanned beam system may utilize one or more techniques and technologies for generating the angle space light, including, for instance, liquid crystal on silicon (LCoS), beam steering, and digital light processing (DLP) techniques. A microelectromechanical system (MEMS) example of a beam steering system is described below in connection with FIG. 9. The construction, configuration, and other characteristics of the source 102 of the angle space light 110 may vary.

The splitter 106 is disposed along the optical axis 108 between the source 102 and the reconvergent sheet 104. The splitter 106 is configured to redirect the light exhibiting the re-formed exit pupil in a direction offset from the optical axis 108. For example, the splitter 106 may be oriented to redirect the light in a direction orthogonal to the optical axis 108. Other directions may be used to accommodate various usage scenarios. In the example of FIG. 1, the splitter 106 is disposed and configured as a combiner to allow the ambient light 120 to reach the plane or field of view 118 at which the re-formed exit pupil is exhibited.

The splitter 106 may be or include various types of beam splitters. In some cases, the splitter 106 is or includes a polarizing beam splitter. In such cases, a retarder, such as a quarter-wave retarder layer, may be disposed in between the splitter 106 and the reconvergent sheet 104, in order to convert the input polarization into an orthogonal polarization state upon output toward splitter 106, such that the light may be reflected upon the second pass at splitter. The quarter-wave retarder layer may be located at any point between the splitter 106 and the reflective surface 112, including, for instance, as a film or other layer disposed on the splitter 106, on an outer or inner mirror surface of the reconvergent sheet 104, or as a separate plane in between the splitter 106 and the reconvergent sheet 104. In some cases, the polarization-based beam-splitting arrangement may be configured to transmit light of a given polarization state upon a first pass through the splitter 106, change to an orthogonal polarization state through double pass through retarder layer, and then be reflected upon second pass through the splitter 106. Alternatively, the arrangement may be configured to reflect light of a given polarization state upon a first pass through the splitter 106, change to an orthogonal polarization state through double pass through the retarder layer, and then be transmitted upon second pass through splitter 106. A half-silvered mirror or other partially reflective element may alternatively be used. The reflective element may be a reflective coating, such as a dichroic coating. The construction, configuration, and other characteristics of the splitter 106 may vary.

As shown in FIG. 1, the optical axis 108 is free of lensing elements between the source 102 and the reconvergent sheet 106. In this case, the optical axis 108 is free of any optical elements between the source 102 and the reconvergent sheet 106 other than the splitter 106. The display 100 is capable of having a shorter track length due to the absence of field optics, viewing optics, an intermediate image plane, an exit pupil expander, a scattering screen, and other optical elements disposed along the optical axis 108 in traditional systems for converting scan angle into field of view. The shorter track length is useful in various usage scenarios, including, for instance, in near-eye and other portable devices. In other cases, the display 100 includes one or more optical elements disposed along the optical axis 108 in addition to the splitter 106. For example, in cases where exit pupil expansion is desired and a scanned beam system is utilized as the source 102, a layered plate or guide that forms laterally offset replicas of the exit pupil at the plane thereof may be used to expand the exit pupil as input to the display 100. The plate may include embedded, partially reflective facets having a tilt angle in order to transmit a portion of light through while reflecting a portion of light laterally, then redirecting a portion of that light along the original direction, thereby forming multiple laterally offset replicas of the original limited size exit pupil.

The absence of the field optics, viewing optics and other optical elements leads to low distortion. Any distortion observable at the plane of the viewer 116 may be limited to that presented by the source 102 (e.g., beam scanner) alone. As a result, the display 100 is not dependent upon the incorporation of correcting elements.

The components of the display 100 are flat or generally flat. In one example, the reconvergent sheet 104 and the splitter 106 may be pane- or panel-shaped. As a result, in some cases, the reconvergent sheet 104, the splitter 106, and/or other components of the display 100 are foldable. For example, one or more of these components may include hinges, seams, or other features to facilitate folding. Folding the display 100 may be useful in connection with portability and/or reconfiguration for different operational modes.

Figure 2:
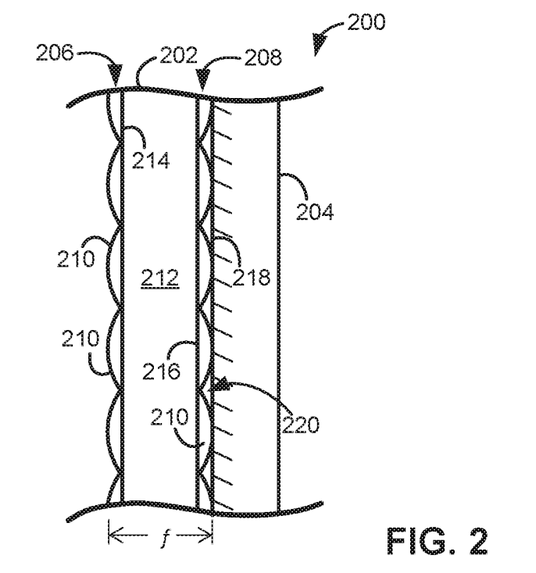
FIG. 2 is a schematic, side view of a reconvergent sheet of the display of FIG. 1 in accordance with an example having an in-tandem pair of microlens arrays (MLAs).
Figure 3:
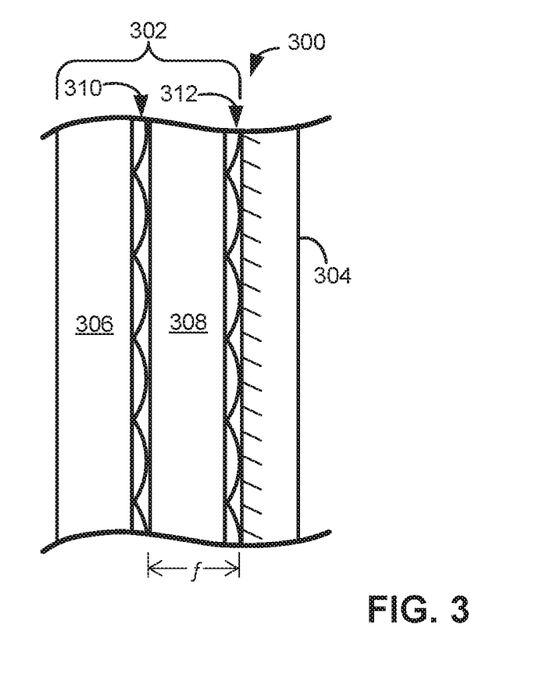
FIG. 3 is a schematic, side view of an MLA-based reconvergent sheet in accordance with another example.
Figure 4:
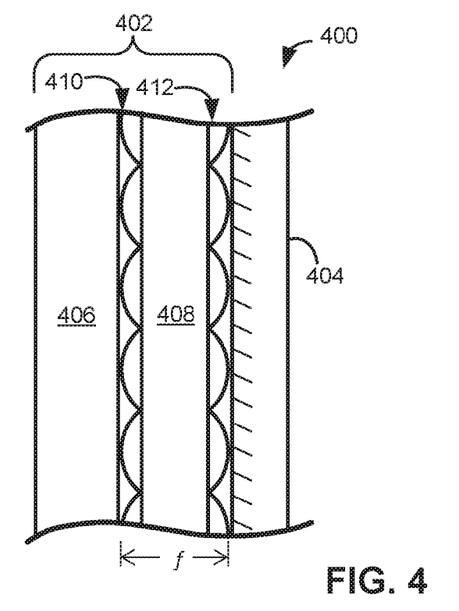
FIG. 4 is a schematic, side view of an MLA-based reconvergent sheet in accordance with yet another example.

FIGS. 2-4 provide MLA-based examples of lens array assemblies for use in a combiner or other retroreflective display, such as the display 100 of FIG. 1. The assemblies of FIGS. 2-4 may be used as the reconvergent sheet 104 and the reflective surface 112 of FIG. 1. In these cases, the reconvergent sheet of each example is an MLA-based retroreflective sheet. Each assembly may be configured as a multi-layer film or other sheet. For example, each assembly may be or include a laminated stack of films, coatings, and/or substrates. In each case, a low index adhesive or laminate may be disposed between the respective layers of the assembly. Alternatively or additionally, other low index media may be used, including, for instance, air gaps.

FIG. 2 shows a lens array assembly 200 with an MLA-based reconvergent sheet 202 and a reflective layer or mirror 204 in accordance with one example. The reconvergent sheet 202 and the reflective layer 204 are arranged in a stack. The reconvergent sheet 202 includes two in-tandem microlens arrays 206, 208. The arrays 206, 208 are disposed in respective, parallel planes oriented orthogonally to the optical axis 108 (FIG. 1). The arrays 206, 208 are thus sequentially disposed along the optical axis 108 to receive the angle space light from the source 102 (FIG. 1). The angle space light passes through the array 206 before reaching the array 208.

The lens array assembly 200 has a plurality of cells. As described below, each cell is configured to exhibit a pair of Fourier transform lenses. Each array 206, 208 includes a respective set of constituent lenslets 210. Respective pairs of the lenslets 210 make up each cell of the lens array assembly 200. Each constituent lenslet 210 may be a plano-convex lens having a common focal length, f.

The arrays 206, 208 are configured to implement a Fourier transform of the angle space light. The arrays 206, 208 are separated from one another along the optical axis 108 (FIG. 1) by the common focal length, f. The focal length separation of the arrays 206, 208 establishes that the array pair implements a phase-corrected Fourier transform of the angle space light. The arrays 206, 208 thus form a plurality of Fourier transform cells to transform the angle space light into position space light.

Use of two-lens in-tandem Fourier transform MLA pairs enables higher spatial frequency content (corresponding to higher angle light) to transmit without clipping. Such transmission, in turn, allows formation of a Sinc-like function that is more highly resolved, containing higher spatial frequency content, and limited primarily only by MLA acceptance numerical aperture (NA). This in turn allows the converging conelets out of each cell to be stitched forming a core NA without gaps within the solid angle of the NA. Impact on the Fourier transform due to lenslet sag profile may be reduced by using aspheric lenslet profiles, such as a conic constant in the range of −0.25 to −0.4, or other aspheric profiles.

For a given lenslet design, the Fourier transformation follows a mathematical relationship dependent on object distance (in this case, effectively infinity) along with a number of lenslet parameters. For two lenses in tandem, $f_{1a}$ and $f_{1b}$, separated by distance D, the distance $s_i$ after the last lens at which an image of an input object, at distance $z_o$ before the first lens, occurs may be defined as $$s_i = \frac{f_{1b}(D(f_{1a} - z_o) + f_{1a}z_o)}{D(f_{1a} - z_o) + f_{1b}z_o + f_{1a}(z_o - f_{1b})}$$

However, when focal lengths $f_{1a}$ and $f_{1b}$ are configured as a Fourier Transform pair, such that $f_{1a}=f_{1b}=f_1$ and separation distance $D=f_{1a}=f_1$, then the image distance of the input object, occurs at distance $s_i$ after the last lens, which simplifies to $Z_{g1}$:

$$z_{g1} = \frac{f_1(f_1(f_1 - z_o) + f_1 z_o)}{f_1(f_1 - z_o) + f_1 z_o + f_1(z_o - f_1)} = \frac{f_1^2}{z_o}$$

where $f_1$ is the focal length of each lens of the two-lens in-tandem Fourier transform pair and $z_o$ is the object distance before the first lens.

In the retroreflective case of FIG. 2, the image distance is effectively zero because the angle space light from the source has an object distance $z_o$ of effectively infinity. A phase-corrected Fourier transform from the angle space into position space (or spatial frequency space) is thus developed at a front surface of the reflective layer 204.

Reflection of the position space light off of the reflective layer 204 results in another phase-corrected Fourier transformation. This time, the position space light is transformed back into angle space light in accordance with the relationship referenced above. The configuration thus becomes symmetric. The above-referenced function establishes that the position space light passing back through the constituent lenslets of the in-tandem microlens arrays of the array pair re-converges to re-form the exit pupil of the original angle space light.

In the example of FIG. 2, the arrays 206, 208 are disposed on opposing sides of a common substrate 212. The lenslets 210 of the array 206 are disposed on a front side 214 of the substrate 212. The lenslets 210 of the array 208 are disposed on a rear side 216 of the substrate 212. In this example, the lenslets 210 of the arrays 206, 208 are oriented with the convex surfaces facing outward in opposite directions. The lenslet orientation leads to the arrays 206, 208 being oppositely faced.

The reflective layer 204 has a reflective surface 218. The reflective surface 218 is disposed past or beyond the reconvergent sheet 202 along the optical axis 108 (FIG. 1). The reflective surface 218 is adjacent the array 208. In this example, portions of the reflective surface 218 are in contact or contiguous with the array 208. An adhesive layer 220 may be disposed between the array 208 and the reflective surface 218 to secure the reconvergent sheet 202 and the reflective layer 204 to one another. Alternatively or additionally, air or other gas is disposed between the reconvergent sheet 202 and the reflective layer 204. The adhesive layer 220 may be composed of one or materials to establish a low refractive index, such as a refractive index lower than a refractive index of the lenslets 210.

During operation, far field or angle space light passes through the arrays 206, 208 to Fourier transform the scan angles of the far field light into position space light. The reflective layer 204 is disposed past the array 208 such that the position space light is reflected backward to pass back through the arrays 206, 208 after reflection off of the reflective surface 218. Passing through the arrays 206, 208 again implements another Fourier transformation, this time being from position space back to angle space. The exit pupil in angle space may thus be re-formed.

The lenslets 210 may be arranged in a variety of two-dimensional patterns. For example, the lenslets 210 may be disposed in a hexagonal array, a square array, or other arrangement. The lateral shape of each lenslet 210 may vary accordingly. Extra-mural absorption (EMA) glass may be used to block light from encountering the edge of an adjacent cell. Other absorbing coatings or layers may be used.

Each lenslet 210 may be composed of a material having a higher refractive index than the substrate 212. In one example, the substrate 212 is composed of glass, and a thin microlens layer is replicated on each surface using UV-cure adhesive resin, which may be cured using ultraviolet light, and a mold master. The lenslets 210 may alternatively be formed separately from the substrate 212 and affixed or otherwise secured thereto. For example, the lenslets 210 may be formed, and then applied to the substrate 212 with optically clear adhesive. Various other materials or constructions may be used, including, for instance, a substrate-lenslet combination integrally formed via injection molding. Other techniques for forming the lenslets 210 may be used. For example, in cases in which the microlenses are formed using UV-replication, the substrate may be glass or rigid plastic, and the adhesive may be a UV-curable adhesive such as NOA81 or NOA61 available commercially from Norland Products. Further, in cases involving compression or injection molding, the polymer may be polymethyl methacrylate (PMMA) or polycarbonate, as an example.

The pitch of the arrays 206, 208 may correspond with the order of the diameter of the scanner or other scanning element of the source 102 (FIG. 1). Selecting an appropriate pitch may minimize or prevent diffraction effects. In one example, a pitch of about 0.5 mm was used for a scanner diameter of about 1.0-1.2 mm. Both the pitch and the scanner diameter may vary in accordance with, for instance, the size of the display. For example, in some cases, the pitch falls in a range from about 250 microns to about 500 microns, such as 300 microns. In other cases, pitch may be as large as 1 mm.

Surfaces may be optically coated with anti-reflective (AR) coatings to minimize loss and scatter due to Fresnel reflections. In cases using UV-cure adhesives, a glass master may be utilized to minimize distortion. Other examples include injection molding in a homogenous polymer, such as acrylic or polycarbonate, compression molding of polymer sheets, and nanoprinting. For compression molding, a nickel shim may be formed of a master negative using an electroform nickel process. A master may also be formed using diamond machining, such as plunge cutting a rotating cutter having a profile form for each lenslet, or diamond turning each lenslet. For high accuracy and fill factor, a lithography-based glass etching technique may be used to fabricate the MLA master.

Various profiles may be used for each lenslet 210. For example, the lenslets 210 may have spheric, conic, or other aspheric profiles. The extent or degree to which the profiles are aspheric or conic may vary. In some cases, the lenslets 210 may have profiles with conic constants directed to reducing aberrations and/or allow the lens system to accommodate higher numerical apertures (NA).

FIG. 3 shows an optical assembly or stack 300 having a reconvergent sheet 302 and a reflective layer 304. In this example, the reconvergent sheet 302 includes multiple substrates 306, 308. One microlens array 310 is disposed on the substrate 306, while another microlens array 312 is disposed on the substrate 308. In this case, the arrays 310, 312 are disposed along rear surfaces of the substrates 306, 308. The incident source light passes through the respective substrate before reaching the lenslets of the corresponding array.

The array orientation of the lenslets of the reconvergent sheet 302 differs from the oppositely faced orientation shown in FIG. 1. In this case, the lenslets of the arrays 310, 312 are oriented in the same direction, with the convex surfaces facing rearward. The orientation of the lenslets of the arrays may differ from the examples shown. Other aspects of the reconvergent sheet 302 and the reflective layer 304 may be similar to those described above.

FIG. 4 shows an optical assembly or stack 400 having a reconvergent sheet 402 and a reflective layer 404. The reconvergent sheet 402 includes multiple substrates 406, 408, as in the example of FIG. 3, but with oppositely oriented arrays 410, 412 disposed thereon, respectively. The lenslets of the array 410 are oriented with the lens surface facing forward, while the lenslets of the array 412 face rearward. In this case, the lenslets 410 are formed on the substrate 406 as plano-concave structures. Other aspects of the reconvergent sheet 402 and the reflective layer 404 may be similar to those described above.

In some cases, the use of a flat mirror or other reflective layer in the examples of FIGS. 2-4 may produce some stray light from outlier rays for higher angles of incidence. Masking may be incorporated into the assembly to avoid or minimize such aberrations. Contrast may thus be improved. The masking may be disposed on the mirror and/or the array near the seams of the array for cases of using microlens arrays having less than 100% fill factor. Further, masking may be disposed as a pattern on the substrate prior to replication. A perforated sheet forming a wall array may be added between the microlens array and the mirror. Also, a sheet having angular selectivity may be used before the sheet, such as an interference-based dichroic sheet having angular selective properties such that low angles are allowed to transmit, while high angles are blocked.

The aberrations may be substantially caused by the field curvature of the best focus surface at the second array relative to the input angle. With this recognition, the aberrations may also be addressed (e.g., minimized or avoided) by combining the lensing and mirror functions at a single surface, as described in the example of FIG. 5.

Figure 5:
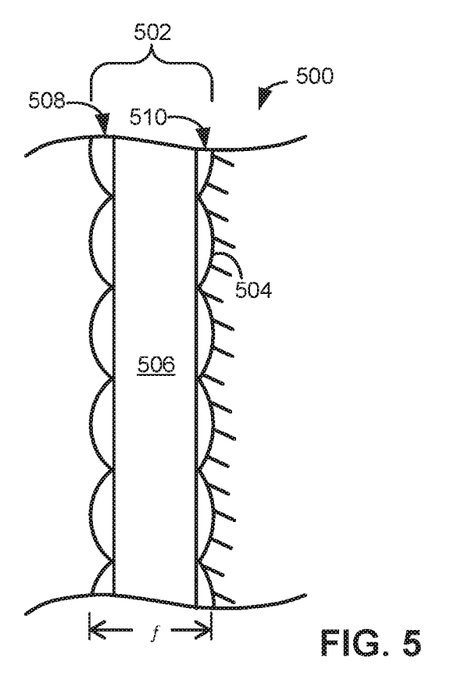
FIG. 5 is a schematic, side view of a single-substrate MLA-based reconvergent sheet with a reflective surface in accordance with one example.

FIG. 5 shows an optical assembly 500 having a reconvergent sheet 502 and a reflective surface 504 disposed on a single substrate 506. The reconvergent sheet 502 includes a pair of in-tandem microlens arrays 508, 510, as in the examples described above. In this case, the lenslets of the arrays 508, 510 have convex surfaces facing outward, as in the examples of FIGS. 2 and 4. In contrast to the examples described above, the reflective surface 504 is a coating or other surface on a rear side of the reconvergent sheet 502. The coating is applied to the surface of the array 510. For example, the reflective surface 504 may be or include a coating composed of a metallic or other reflective material. Other coatings may be used. For example, the reflective surface 504 is a dichroic coating or rugate coating.

The focal length of the lenslets of the array 510 is shorter than the focal length of the lenslets of the array 508 because the microlens surface is reflective, and is on order of half the thickness of sheet. As a result, input light rays from various angles through the center of microlenses of 508 are reflected by the curvature of the array 510, such that those rays pass back through substantially near the centers of the microlenses of the array 508. This implies a radius of curvature, which may also be aspheric, on the order of the thickness of the sheet 502 for best efficiency. The reflective nature of the surface of the lenslets of the array 510 doubles the optical power of the lenslets. The focal length is halved (e.g., f/2) to compensate for that change in optical power. The arrays 508, 510 are separated by the focal length, f, of the lenslets of the array 508, as in the examples described above. The lenslets of one or both of the MLA arrays 508, 510 may include conic/aspheric profile to, for instance, improve off-axis performance.

The optical assembly 500 is capable of roll-to-roll fabrication while achieving higher performance. Combining the functions of the second array and the mirror may result in a simplified double-sided structure. The structure is well-suited for roll-to-roll manufacturing (e.g., with two-sided alignment and thickness control). The reflector curvature reflects input the light cone accepted from a given angle back through the first layer efficiently, while also providing the phase correction.

The assembly 500 may be a solid film. As a result, an adhesive backing may be applied to the back side (i.e., the side with the reflective coating or other surface) to enable the application of the film as a "peel and stick" sheet or film. A release liner may also be secured to the adhesive backing until application.

Figure 6:
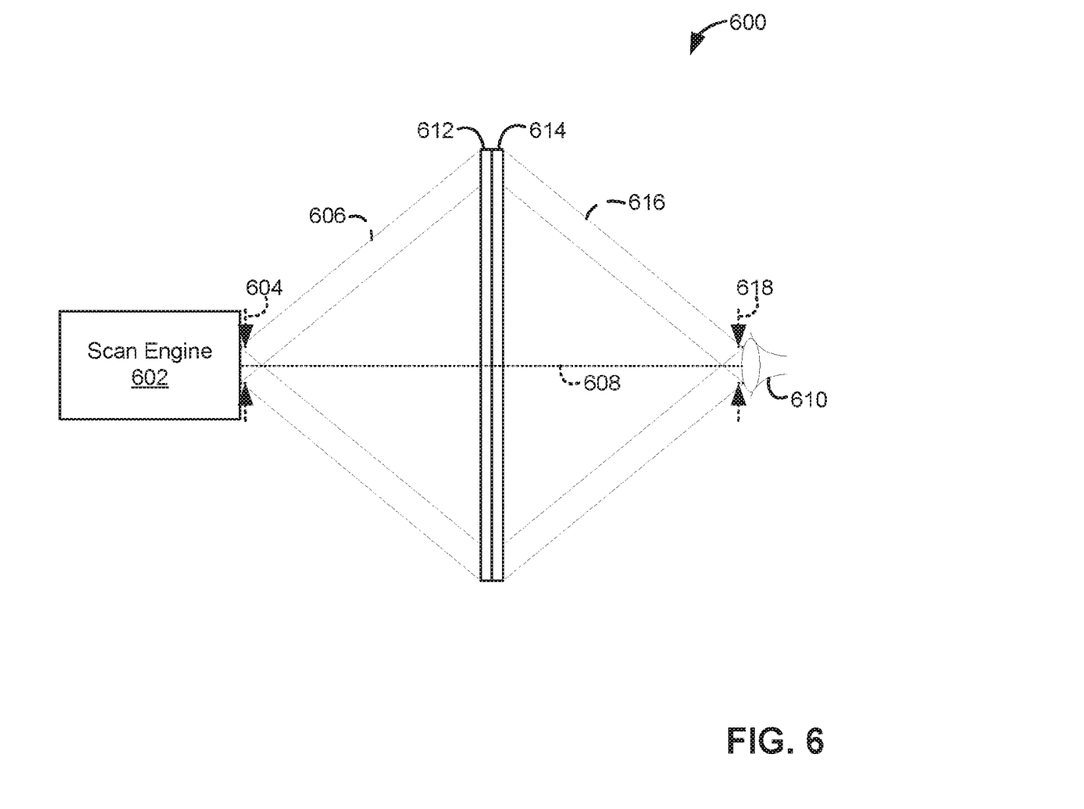
FIG. 6 is a schematic view of an occluded display with back-to-back MLA-based sheets to re-form an exit pupil in accordance with one example.

FIG. 6 shows a display 600 configured for transmissive exit pupil re-formation. In this case, the display 600 may be an occluded display rather than a see-through display. The display 600 may thus be incorporated into devices and usage scenarios that do not involve or attempt to display the image content of the ambient light. The display 600 may nonetheless be useful in connection with types of devices that may otherwise include see-through displays, such as near-eye displays. Alternatively, the display 600 may be incorporated into devices that utilize a camera or other image capture device to integrate the image content of the ambient into the content generated by the display 600.

The display 600 includes a source 602 that establishes an exit pupil 604 of angle space light 606. The angle space light 606 may be indicative of far field content, as described above. The source 602 is configured to project the angle space light 606 along an optical axis 608 toward a viewer 610. The source 602 may be or include a scanned beam system or other scan engine or other source of far field content through varying scan angles, as described above.

In this transmissive case, the display 600 further includes two pairs 612, 614 of in-tandem microlens arrays spaced from the source 602 along the optical axis 608. Each array pair 612, 614 may be configured as a respective reconvergent sheet. Examples of the array pairs 612, 614 and reconvergent sheet configuration are described and shown in connection with FIGS. 7 and 8. The first array pair 612 is disposed along the optical axis 608 to receive the angle space light from the source 602. The arrays of the first array pair 612 are sequentially disposed along the optical axis 608 relative to one another and configured to transform the angle space light into position space light. The second array pair 614 is disposed along the optical axis 608 past the first array pair 612 to receive the position space light. The arrays of the second array pair 614 are sequentially disposed along the optical axis 608 relative to one another to re-form the exit pupil 604 in angle space. To that end, the second array pair 614 transforms the position space light provided by the first array pair 612 into angle space light 616. The exit pupil 604 is re-formed as field of view 618 at a plane at which the viewer 610 is disposed.

As shown in FIG. 6, the two array pairs 612, 614 are not spaced from one another. The two array pairs 612, 614 are instead substantially in contact with one another as shown. The lack of spacing between the arrays 612, 614 is appropriate given that the source 602 is providing angle space light or far field content. Examples showing the contact between the array pairs 612, 614 are depicted and described in connection with FIGS. 7 and 8.

In this example, the optical axis 608 is free of lensing and other optical elements between the source 602 and the two array pairs 612, 614. Various types of optical elements may be disposed along the optical axis 608 in other cases.

Figure 7:
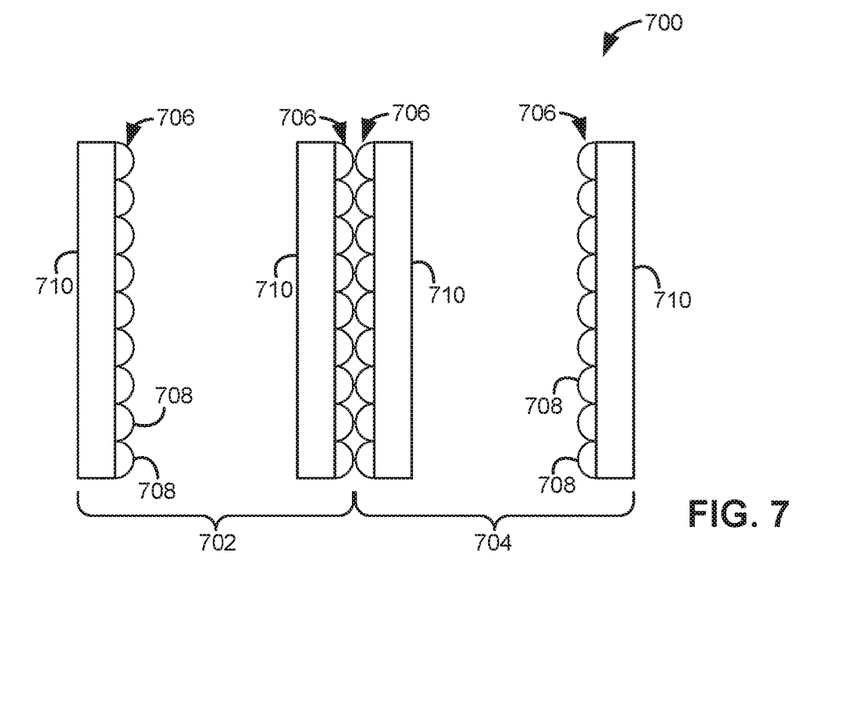
FIG. 7 is schematic, side view of the back-to-back MLA-based sheets of the display of FIG. 6 in accordance with one example.

FIG. 7 shows a transmissive microlens array stack 700 in accordance with one example. The stack 700 includes two pairs 702, 704 of in-tandem microlens arrays 706. Each microlens array 706 includes a respective set of constituent lenslets 708, each constituent lenslet 708 having a common focal length. The in-tandem arrays 706 of each pair 702, 704 are spaced from one another by the common focal length. As a result, the arrays 706 of each pair 702, 704 form a plurality of Fourier transform cells.

In this example, each array 706 is formed on a respective substrate 710 of the stack 700. A total of four substrates 710 are thus included. The lenslets 708 of each array 706 are disposed on the inward face of each substrate 710. In this case, the planar surfaces of each lenslet 708 are disposed along the substrate face. The convex surface of each lenslet 708 is disposed on the inward surface of the lenslet 708. As a result, the lenslets 708 of the array pair 702 are oriented in a different direction than the lenslets of the array pair 704. A variety of other substrate configurations and lenslet arrangements and orientations may be used.

The lenslets 708 of the inner arrays 706 of the two array pairs 702, 704 are substantially in contact with one another as shown. There may be adhesive (e.g., a low index adhesive material) disposed at the interface of the array pairs 702, 704. The array pairs 702, 704 may still be considered to be in contact with one another even though portions of the array pairs may be spaced from one another by the adhesive material. For example, the curvature of the lenslets may result in partial spacing as shown.

Figure 8:
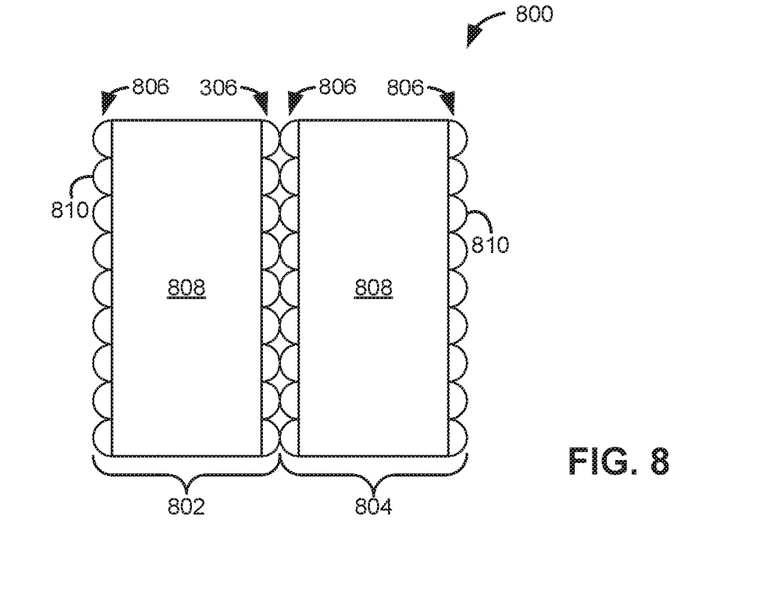
FIG. 8 is schematic, side view of the back-to-back MLA-based sheets of the display of FIG. 6 in accordance with another example.

FIG. 8 shows a transmissive microlens array stack 800 in accordance with another example. As above, the stack 800 includes two pairs 802, 804 of in-tandem microlens arrays 806. In this case, each array 802, 804 is disposed on a respective substrate 808 of the stack 800, for a total of two substrates 808. Lenslets 810 of the arrays 806 are disposed on opposing sides of each substrate 808. The planar surfaces of each lenslet 810 are again disposed along the respective substrate face. In this case, the orientation of the lenslets 810 varies in accordance with the substrate face. The convex surface of the lenslets 810 is on outward surface of the lenslets 810 for the arrays 806 on the outer sides of the substrates 808. The convex surface of the lenslets 810 is on an inward surface if the lenslets 810 for the arrays 806 on the inner sides of the substrates 808.

The lenslets 810 of the respective arrays 806 of the two pairs 802, 804 on the inner sides of the substrates 808 are in contact with one another, as in the example described above. There may be adhesive (e.g., a low index adhesive material) disposed at the interface of the array pairs 802, 804. The array pairs 802, 804 may still be considered to be in contact with one another even though portions of the array pairs may be spaced from one another by the adhesive material. For example, the curvature of the lenslets may result in partial spacing as shown.

Non-unity magnification, or scaling of the scan angle, may be provided in the transmissive examples of FIGS. 7 and 8 by adjusting lenslet pitch and focal length. In these cases, the lenslets of the four arrays are not registered with one another. The pitch $d_1$ for the lenslets 810 of the first and second arrays 806 of the first array pair 802 becomes $d_{1a}$ and $d_{1b}$. The pitch $d_2$ of the first and second arrays 806 of the second array pair 804 for the lenslets 810 becomes $d_{2a}$ and $d_{2b}$. In one positive magnification case, $d_{2b} > d_{2a} > d_{1b} > d_{1a}$. The above-referenced function then may be expressed as follows (with $z_1$ and $z_2$ representing the input and output conjugate distances, respectively):

$$d_2 = \frac{d_{2b}f_2 z_1 + d_{1b}f_1 z_2 + d_1 z_1 z_2}{z_1(2f_2 + z_2)}$$

Figure 9:
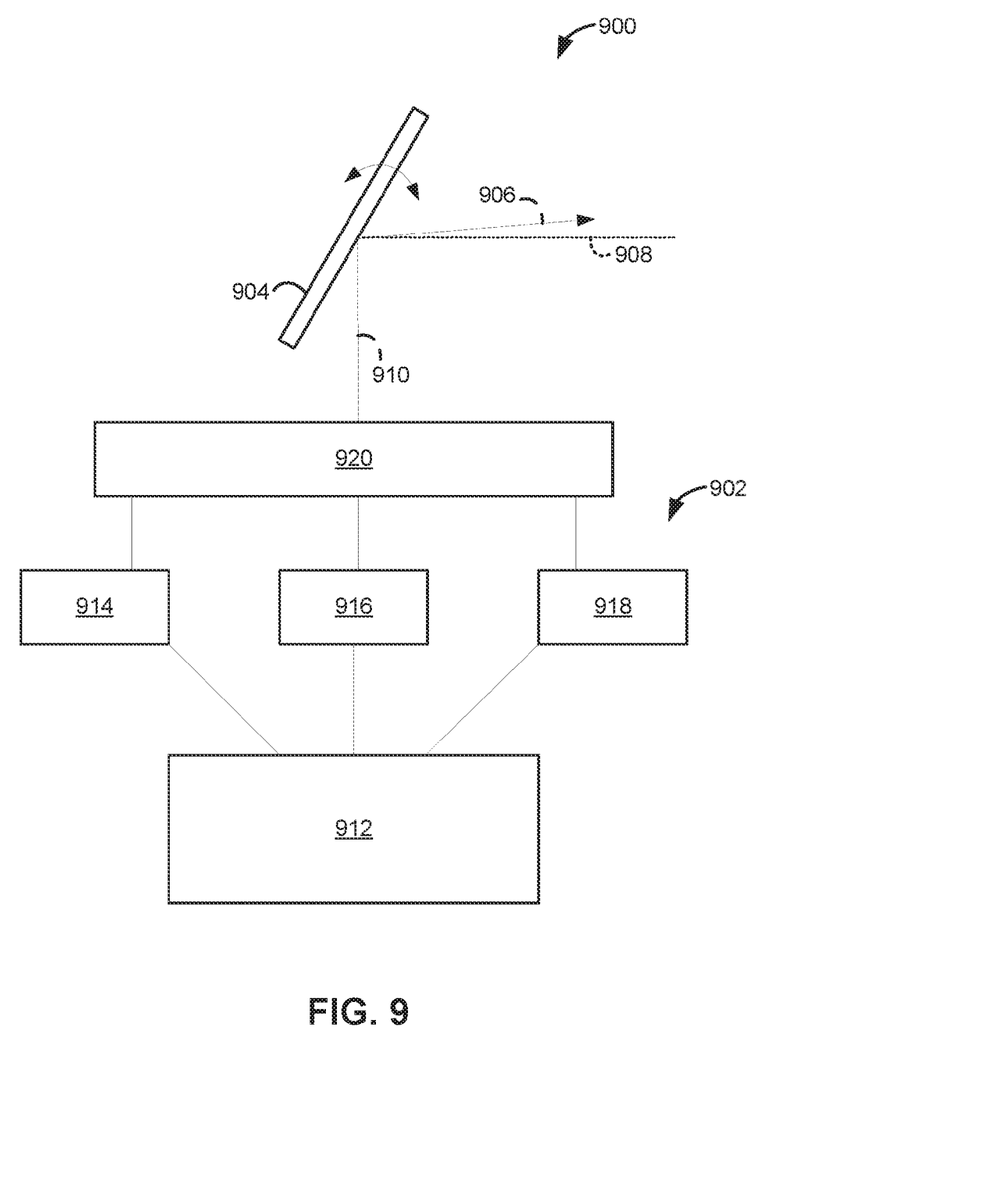
FIG. 9 is a schematic, diagrammatic view of a scan engine of the displays of FIGS. 1 and 8 in accordance with one example.

FIG. 9 shows a scan engine 900 in accordance with one example. The scan engine 900 may be used as a source of far field content in any of the above-described displays. The scan engine 900 includes a beam generator 902 and a beam steering assembly or scanner 904. The scanner 904 is configured to redirect a beam 906 at a desired scan angle relative to an optical axis 908 of the display in which the scan engine 900 is incorporated. The beam 906 is directed generally along the optical axis 908 of the display toward a splitter and/or one or more reconvergent sheets of the display. As described above, viewing optics, intermediate image plane, and other optical elements are not required to prepare the beam 906. Nonetheless, in some cases, the scan engine 900 (or the display) may include one or more elements along the optical axis 908 disposed between the scanner 904 and the splitter and/or reconvergent sheet(s) of the display.

In this example, the beam generator 902 generates a color output beam 910. The beam generator 902 includes image electronics module 912, red (R), green (G), and blue (B) beam sources 914, 916, and 918 for respectively generating R, G, and B beams, and a beam-combiner-and-conditioner assembly 920. Additional, alternative, or fewer wavelengths of light may be generated or used. For example, the scan engine 900 uses a single color or a subset of R, G and B in other cases.

The electronics module 912 modulates the R, G, and B beam sources 914, 916, and 918, and thus the respective beams generated thereby, such that the output beam 910 has the desired intensity and color content for a pixel of the image that the electronics module 912 is currently generating. The electronics module 912 may modulate the beam sources 914, 916, and 918 using time modulation, where a beam is full "on" for a predetermined portion of the pixel-generation time and full "off" for another portion of the pixel-generation time. Other modulation schemes may be used. For example, the electronics module 912 may modulate the beam sources 914, 916, and 918 using intensity modulation, where the intensity of a beam is modulated to a predetermined level for the entire pixel-generation time.

The beam sources 914, 916, and 918 may be conventional R, G, and B lasers or light-emitting diodes (LEDs), and the beams generated thereby may propagate to the beam-combiner-and-conditioner assembly 920 through the air (or other medium), via an optical fiber, and/or via other optical path(s). One or more of the beam sources 914, 916, 918 may be located remotely from the rest of the scan engine 900 (or remainder of the display). For example, the beam sources 914, 916, 918 may be located in the trunk of a vehicle having a heads-up display for an operator. The location, configuration, construction, and other characteristics of the beam sources 914, 916, 918 and other components of the scan engine 900 may vary.

The beam-combiner-and-conditioner assembly 920 combines the R, G, and B beams from the beam sources 914, 916, 918 into the output beam 910. The beam-combiner-and-conditioner assembly 920 may be configured to establish the intensity profile, shape, and other characteristics of the output beam 910. For example, in some cases, the beam-combiner-and-conditioner assembly 920 imparts to the output beam 910 a top-hat intensity profile and a hexagonal shape. A variety of other intensity profiles and shapes may be used.

The scanner 904 sweeps the output beam 910 in two dimensions (e.g. vertical and horizontal) to generate the angle space light of the image to be viewed by the operator. The scanner 904 may be a microelectromechanical system (MEMS) scanner that sweeps the output beam 910. Other types of scanners may be used. The scanner 910 may sweep the output beam 60 sinusoidally, e.g., resonantly, in the horizontal dimension, and linearly in the vertical dimension. Alternative or additional scan patterns may be used. For instance, the scanner 904 may alternatively sweep the beam 910 resonantly in the vertical dimension as well.

Described above are examples of displays capable of re-forming the exit pupil of angle space light. The exit pupil is re-formed in a manner independent of scanner and input size. Both transmissive and retroreflective versions are possible to support occluded or see-through usage scenarios. In the retroreflective examples, a low cost combiner is formed by using a high efficiency and high quality reconvergent sheet, such as an MLA-based imaging type of retroreflective sheet) in conjunction with a scanner and a splitter. In some cases, the scan angle of the source is mapped directly to the field of view (FOV) of the viewer, but scaling may be achieved in transmissive cases. Distortion in the display output may be small, e.g., limited to the distortion of the scanner itself, due to quality retroreflection and the lack of distortion introduced by scan engine optics, field lenses and viewing optics in other scanned beam displays. The display output is achieved without wavelength or polarization restrictions, thereby enabling full color displays.

In some cases, units may be angularly tiled for very wide field of view. Alternatively or additionally, layers and/or coatings may be added to the splitters in order to achieve pupil replication and exit pupil expansion, which may be useful in connection with limited sized scanners. These options take either (1) multiple projectors and orient the outputs to be placed closely adjacent or overlaid (e.g., as a combiner) and pointing at different angles into a common reconvergent sheet such that two or more fields of view appear reconverged and stitched together by the viewer, or (2) multiple reconvergent display systems angularly oriented, e.g., as by rotational offset, such that all outputs converge toward the viewer eye, such that each system contributes a portion of the field of view seen by the viewer. For cases involving exit pupil expansion, the splitter may alternatively include several partially reflective parallel layers configured to form laterally offset replicas of the source object, thereby widening the effective pupil at viewer's eye plane.

Figure 10:
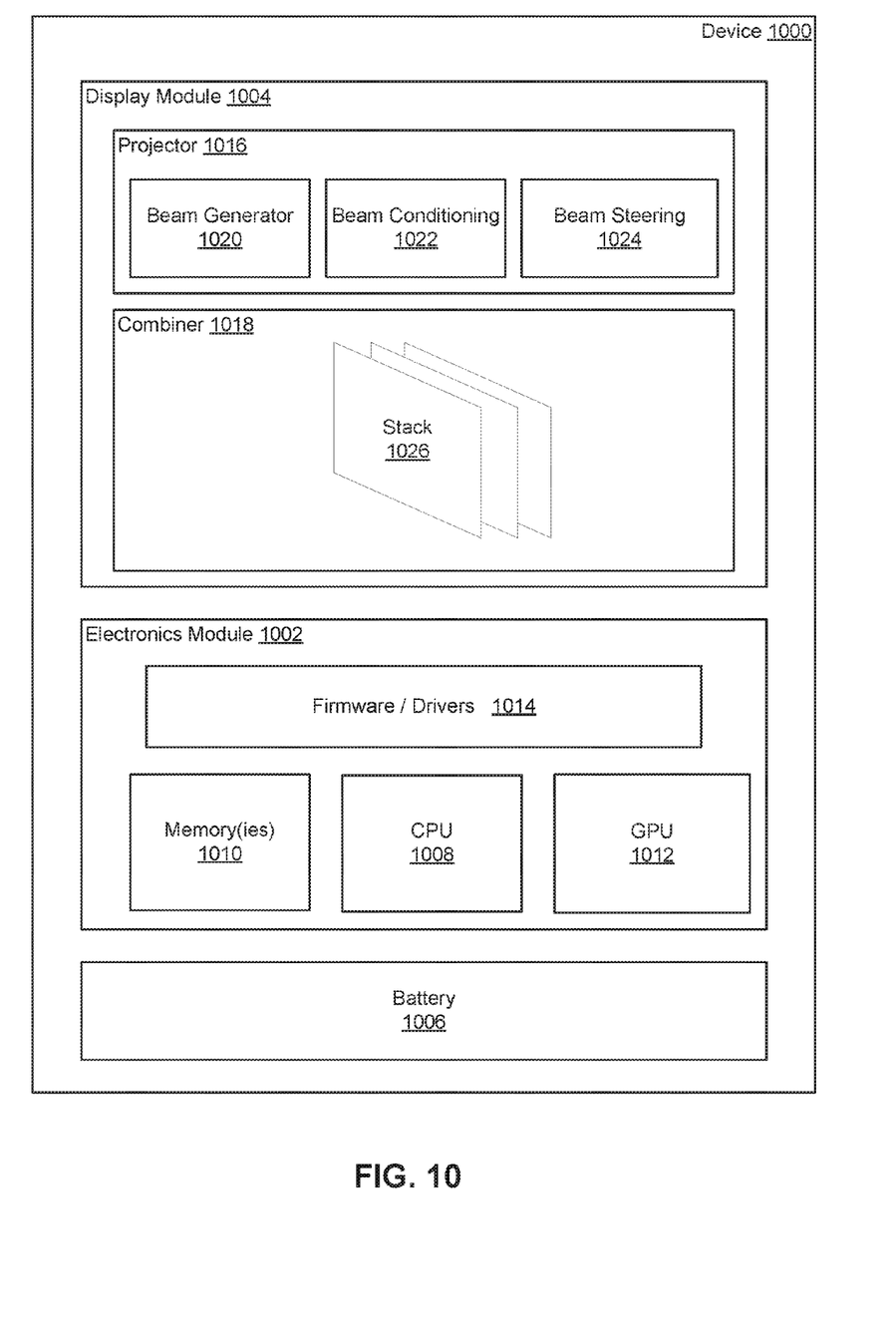
FIG. 10 is a block diagram of an electronic device having an exit pupil-forming display in accordance with one example.

FIG. 10 shows an electronic device 1000 in which the reconvergent imaging of the above-described examples may be incorporated. The electronic device 1000 has an electronics module 1002 and a display module 1004 (or subsystem), and a battery 1006. The electronic device 1000 may include additional, fewer, or alternative components. For example, the display module 1004 may be integrated with the electronics module 1002 and/or other components of the electronic device 1000 to a varying extent. For instance, the electronics module 1002 and/or the display module 1004 may include a graphics subsystem of the electronic device 1000. Any number of display modules or systems may be included. In this example, the device 1000 includes a processor 1108 and one or more memories 1010 separate from the display module 1004. The processor 1008 and the memories 1010 may be directed to executing one or more applications implemented by the device 1000. The display module 1004 generates a user interface for an operating environment (e.g., an application environment) supported by the processor 1008 and the memories 1010. The processor 1008 may be a general-purpose processor, such as a central processing unit (CPU), or any other processor or processing unit. Any number of such processors or processing units may be included.

In the example of FIG. 10, the electronics module 1102 includes a graphics processing unit (GPU) 1012 and firmware and/or drivers 1014. The GPU 1012 may be dedicated to graphics- or display-related functionality and/or provide general processing functionality, which may or may not include graphics-related processing in connection with the floating display. Some of the components of the electronics module 1002 may be integrated. For example, the processor 1008, the one or more of the memories 1010, the GPU 1012, and/or the firmware 1014 may be integrated as a system-on-a-chip (SoC) or application-specific integrated circuit (ASIC). The electronics module 1002 may include additional, fewer, or alternative components. For example, the electronics module 1002 may not include a dedicated graphics processor, and instead rely on the CPU 1008 or other general-purpose processor to support the graphics-related functionality of the electronic device 1000. The electronics module 1002 may include additional memory (or memories) to support display-related processing.

In the example of FIG. 10, the display module 1004 includes a scan engine or other projector 1016 and a combiner 1018. The projector 1016 may be or include any source of angle space light indicative of far field content. In this example, the projector 1016 includes a beam generator 1020, a beam conditioning unit 1022, and a beam steering unit 1024. The combiner 1018 includes a stack or assembly 1026 of one or more reconvergent sheets. The stack 1026 may be configured in accordance with one or more of the examples described above. For instance, the stack 1026 may have a double pass, retroreflective configuration, in which the stack 1026 further includes a splitter and a reflective layer or other surface. Additional, fewer, or alternative display components may be provided. For example, in some cases, the scan engine 1016 does not include a beam conditioning unit.

The device 1000 may be configured as one of a wide variety of computing devices, including, but not limited to, near-eye or other portable or wearable computing devices. The device 1000 may also be configured as an electronic display device, such as a heads-up display device. The electronic display device may be any type of display or visual output device, and may not be a portable or wearable device. In such cases, the device 1000 may accordingly not include one or more of the above-described components, such as the battery 1006.

In one aspect, a display includes a source that establishes an exit pupil of far field content, a reconvergent sheet disposed along an optical axis to receive light of the far field content, the reconvergent sheet being configured to reconverge the far field content in position space, a reflective surface disposed along the optical axis for reflection of light of the position space back through the reconvergent sheet after reflection off of the reflective surface to re-form the exit pupil of the far field content, and a splitter disposed along the optical axis between the source and the reconvergent sheet and configured to redirect light exhibiting the re-formed exit pupil in a direction offset from the optical axis.

In another aspect, a display includes a source that establishes an exit pupil of angle space light, first and second in-tandem microlens arrays sequentially disposed along an optical axis to receive the angle space light, each of the first and second microlens arrays including a respective set of constituent lenslets, each constituent lenslet having a common focal length such that the first and second in-tandem microlens arrays form a plurality of Fourier transform cells to transform the angle space light into position space light, a reflective layer disposed past the second microlens array such that the position space light passes back through the first and second in-tandem microlens arrays after reflection off of the reflective layer to re-form the exit pupil in angle space, and a splitter disposed along the optical axis between the source and the first and second in-tandem microlens arrays to redirect light exhibiting the re-formed exit pupil in a direction offset from the optical axis.

In yet another aspect, a display includes a source that establishes an exit pupil of angle space light and first and second pairs of in-tandem microlens arrays spaced from the source along an optical axis, each array of the first and second pairs of in-tandem microlens arrays including a respective set of constituent lenslets, each constituent lenslet having a common focal length such that each array of the first and second pairs of in-tandem microlens arrays forms a plurality of Fourier transform cells. The first pair of in-tandem microlens arrays is disposed along the optical axis to receive the angle space light from the source, the arrays of the first pair being sequentially disposed along the optical axis relative to one another to transform the angle space light into position space light. The second pair of in-tandem microlens arrays is disposed along the axis past the first pair of in-tandem microlens arrays to receive the position space light, the arrays of the second pair being sequentially disposed along the optical axis relative to one another to re-form the exit pupil in angle space.

In connection with any one of the aforementioned aspects, the displays may alternatively or additionally include any combination of one or more of the following aspects or features. The reconvergent sheet includes first and second in-tandem microlens arrays sequentially disposed along an optical axis to receive the light of the far field content. Each of the first and second microlens arrays includes a respective set of constituent lenslets. Each constituent lenslet has a common focal length. The first and second in-tandem microlens arrays are separated from one another along the optical axis by the common focal length such that the first and second in-tandem microlens arrays form a plurality of Fourier transform cells. The optical axis is free of lens elements between the source and the reconvergent sheet. The display further includes a reflective layer that provides the reflective surface, the reflective layer being disposed past the reconvergent sheet along the optical axis. The reflective surface is a surface on a side of the reconvergent sheet. The reconvergent sheet and the reflective surface are foldable. The splitter is disposed as a combiner to allow ambient light to reach a plane at which the re-formed exit pupil is exhibited. The splitter includes a polarizing splitter. The source includes a scanned beam system. The first and second pairs of in-tandem microlens arrays are not spaced from one another. The first and second pairs of in-tandem microlens arrays are in contact with one another.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A display comprising:
a source that establishes an exit pupil of far field content;
a reconvergent sheet disposed along an optical axis to receive light of the far field content, the reconvergent sheet being configured to implement a phase-corrected Fourier transform to reconverge the far field content in position space;
a reflective surface disposed along the optical axis for reflection of light of the position space back through the reconvergent sheet after reflection off of the reflective surface to re-form the exit pupil of the far field content; and
a splitter disposed along the optical axis between the source and the reconvergent sheet and configured to redirect light exhibiting the re-formed exit pupil in a direction offset from the optical axis.

2. The display of claim 1, wherein:
the reconvergent sheet comprises first and second in-tandem microlens arrays sequentially disposed along an optical axis to receive the light of the far field content;
each of the first and second microlens arrays comprises a respective set of constituent lenslets;
each constituent lenslet has a common focal length; and
the first and second in-tandem microlens arrays are separated from one another along the optical axis by the common focal length such that the first and second in-tandem microlens arrays form a plurality of Fourier transform cells.

3. The display of claim 1, wherein the optical axis is free of lens elements between the source and the reconvergent sheet.

4. The display of claim 1, further comprising a reflective layer that provides the reflective surface, the reflective layer being disposed past the reconvergent sheet along the optical axis.

5. The display of claim 1, wherein the reflective surface is a surface on a side of the reconvergent sheet.

6. The display of claim 1, wherein the reconvergent sheet and the reflective surface are foldable.

7. A display comprising:
a source that establishes an exit pupil of far field content;
a reconvergent sheet disposed along an optical axis to receive light of the far field content, the reconvergent sheet being configured to reconverge the far field content in position space;
a reflective surface disposed along the optical axis for reflection of light of the position space back through the reconvergent sheet after reflection off of the reflective surface to re-form the exit pupil of the far field content; and
a splitter disposed along the optical axis between the source and the reconvergent sheet and configured to redirect light exhibiting the re-formed exit pupil in a direction offset from the optical axis,
wherein the splitter is disposed as a combiner to allow ambient light to reach a plane at which the re-formed exit pupil is exhibited.

8. A display comprising:
a source that establishes an exit pupil of far field content;
a reconvergent sheet disposed along an optical axis to receive light of the far field content, the reconvergent sheet being configured to reconverge the far field content in position space;
a reflective surface disposed along the optical axis for reflection of light of the position space back through the reconvergent sheet after reflection off of the reflective surface to re-form the exit pupil of the far field content; and
a splitter disposed along the optical axis between the source and the reconvergent sheet and configured to redirect light exhibiting the re-formed exit pupil in a direction offset from the optical axis,
wherein the splitter comprises a polarizing splitter.

9. A display comprising:
a source that establishes an exit pupil of far field content;
a reconvergent sheet disposed along an optical axis to receive light of the far field content, the reconvergent sheet being configured to reconverge the far field content in position space;
a reflective surface disposed along the optical axis for reflection of light of the position space back through the reconvergent sheet after reflection off of the reflective surface to re-form the exit pupil of the far field content; and
a splitter disposed along the optical axis between the source and the reconvergent sheet and configured to redirect light exhibiting the re-formed exit pupil in a direction offset from the optical axis,
wherein the source comprises a scanned beam system.

10. A display comprising:
a source that establishes an exit pupil of angle space light;
first and second in-tandem microlens arrays sequentially disposed along an optical axis to receive the angle space light, each of the first and second microlens arrays comprising a respective set of constituent lenslets, each constituent lenslet having a common focal length such that the first and second in-tandem microlens arrays form a plurality of Fourier transform cells to transform the angle space light into position space light;

a reflective layer disposed past the second microlens array such that the position space light passes back through the first and second in-tandem microlens arrays after reflection off of the reflective layer to re-form the exit pupil in angle space; and a splitter disposed along the optical axis between the source and the first and second in-tandem microlens arrays to redirect light exhibiting the re-formed exit pupil in a direction offset from the optical axis.

11. The display of claim 10, wherein the optical axis is free of lens elements between the source and the first and second in-tandem microlens arrays.

12. The display of claim 10, wherein the reconvergent sheet and the reflective layer are foldable.

13. The display of claim 10, wherein the splitter is disposed as a combiner to allow ambient light to reach a plane at which the re-formed exit pupil is exhibited.

14. The display of claim 10, wherein the splitter comprises a polarizing splitter.

15. The display of claim 10, wherein the source comprises a scanned beam system.

16. A display comprising:
a source that establishes an exit pupil of angle space light; and
first and second pairs of in-tandem microlens arrays spaced from the source along an optical axis, each array of the first and second pairs of in-tandem microlens arrays comprising a respective set of constituent lenslets, each constituent lenslet having a common focal length such that each array of the first and second pairs of in-tandem microlens arrays forms a plurality of Fourier transform cells;

wherein the first pair of in-tandem microlens arrays is disposed along the optical axis to receive the angle space light from the source, the arrays of the first pair being sequentially disposed along the optical axis relative to one another to transform the angle space light into position space light, and wherein the second pair of in-tandem microlens arrays is disposed along the axis past the first pair of in-tandem microlens arrays to receive the position space light, the arrays of the second pair being sequentially disposed along the optical axis relative to one another to re-form the exit pupil in angle space.

17. The display of claim 16, wherein the first and second pairs of in-tandem microlens arrays are not spaced from one another.

18. The display of claim 16, wherein the first and second pairs of in-tandem microlens arrays are in contact with one another.

19. The display of claim 16, wherein the optical axis is free of lens elements between the source and the first and second pairs of in-tandem microlens arrays.

20. The display of claim 16, wherein the source comprises a scanned beam system.

* * * * *